(12) United States Patent
Penev et al.

(10) Patent No.: US 8,037,931 B2
(45) Date of Patent: Oct. 18, 2011

(54) HYBRID WATER HEATING SYSTEM

(76) Inventors: Krassimire Mihaylov Penev, Stamford, CT (US); Gordon Patrick Whelan, Stamford, CT (US)

(*) Notice: Subject to any disclaimer, the term of this patent is extended or adjusted under 35 U.S.C. 154(b) by 0 days.

(21) Appl. No.: 12/820,241

(22) Filed: Jun. 22, 2010

(65) Prior Publication Data

US 2010/0257882 A1    Oct. 14, 2010

Related U.S. Application Data

(63) Continuation-in-part of application No. PCT/US2009/049741, filed on Jul. 7, 2009, and a continuation-in-part of application No. 12/205,979, filed on Sep. 8, 2008, now abandoned.

(60) Provisional application No. 61/086,819, filed on Aug. 7, 2008.

(51) Int. Cl.
    *F25B 29/00* (2006.01)
    *F24H 1/00* (2006.01)
    *F24J 2/42* (2006.01)

(52) U.S. Cl. ........ 165/201; 126/585; 126/588; 126/591; 126/598; 126/599; 165/48.2; 62/179; 62/180; 62/183; 62/184; 62/185; 62/177; 62/238.6; 62/201; 62/235.1

(58) Field of Classification Search .................. 165/201, 165/48.2; 62/179, 184, 196.4, 115, 183, 62/238.6, 180, 177, 185, 201, 203, 510, 235.1, 62/238.7, 324.6; 126/588, 589, 615, 591, 126/585, 592, 598, 599
See application file for complete search history.

(56) References Cited

U.S. PATENT DOCUMENTS

| 1,425,174 | A | 8/1922 | Carter et al. |
| 1,888,620 | A | 11/1932 | Clark |
| 1,889,238 | A | 11/1932 | Clark |

(Continued)

FOREIGN PATENT DOCUMENTS

CN    1971184 A    5/2007

(Continued)

OTHER PUBLICATIONS

Heat Recovery from Vapor Compression Air Conditioning A Brief Introduction, M. Guglielmone et al., Turbotec, White Paper, May 14, 2008, available at www.TurbotecProducts.com.

(Continued)

*Primary Examiner* — John Ford
(74) *Attorney, Agent, or Firm* — Hess Patent Law Firm, PC; Robert J. Hess

(57) ABSTRACT

A hybrid heating apparatus heats potable water with waste heat from heat recovery units and insolation from solar collectors. A single circulation pump circulates fluid between at least one heat exchanger and each of the heat recovery units and preferably the solar collector. A single controller receives sensor readings from the heat recovery units and the solar collector units and receives a demand to heat the potable water. To satisfy the demand, the controller determines the extent to which the demand may be satisfied from heat available from the heat recovery units and the solar collector units and sends command signals both to the circulating pump to circulate the fluid and to appropriate ones of valves at connections to those heat recovery units and solar collector units to allow fluid to circulate to be heated to flow to the heat exchanger for effecting heat exchange to heat the potable water.

16 Claims, 4 Drawing Sheets

U.S. PATENT DOCUMENTS

| | | | | |
|---|---|---|---|---|
| 3,299,881 | A | 1/1967 | Koch | |
| 3,922,876 | A | 12/1975 | Wetherington et al. | |
| 3,987,761 | A | 10/1976 | Downs et al. | |
| 4,034,738 | A | 7/1977 | Barber, Jr. | |
| 4,061,267 | A | 12/1977 | Lof | |
| 4,119,087 | A | 10/1978 | Cook | |
| 4,122,801 | A | 10/1978 | Burns | |
| 4,126,122 | A | 11/1978 | Bross | |
| 4,130,110 | A | 12/1978 | Bottum | |
| 4,141,222 | A * | 2/1979 | Ritchie | 62/179 |
| 4,153,043 | A | 5/1979 | Goolsby | |
| 4,157,706 | A | 6/1979 | Gaskill | |
| 4,165,037 | A * | 8/1979 | McCarson | 237/1 R |
| 4,175,518 | A | 11/1979 | Reames et al. | |
| 4,190,199 | A | 2/1980 | Cawley et al. | |
| 4,191,329 | A | 3/1980 | Geaslin | |
| 4,207,866 | A | 6/1980 | Boyd | |
| 4,210,102 | A | 7/1980 | Dosmann | |
| 4,222,349 | A | 9/1980 | Kadan et al. | |
| 4,238,931 | A * | 12/1980 | Campbell | 62/183 |
| 4,246,887 | A | 1/1981 | Christiansen | |
| 4,269,167 | A | 5/1981 | Embree | |
| 4,270,363 | A * | 6/1981 | Maring et al. | 62/196.4 |
| 4,275,687 | A | 6/1981 | Sasaki | |
| 4,285,334 | A | 8/1981 | Collins | |
| 4,287,877 | A | 9/1981 | Gaines | |
| 4,300,536 | A | 11/1981 | Taschuk | |
| 4,308,723 | A * | 1/1982 | Ecker | 62/235.1 |
| 4,314,547 | A | 2/1982 | Walsh | |
| 4,318,367 | A | 3/1982 | Antonucci | |
| 4,324,228 | A | 4/1982 | Shippee | |
| 4,328,791 | A | 5/1982 | Moore | |
| 4,340,033 | A | 7/1982 | Stewart | |
| 4,345,583 | A | 8/1982 | Morin | |
| 4,350,144 | A | 9/1982 | Beckwith | |
| 4,373,473 | A | 2/1983 | Grandmont | |
| 4,374,506 | A | 2/1983 | Whelan | |
| 4,380,156 | A | 4/1983 | Ecker | |
| 4,390,008 | A * | 6/1983 | Andrews | 126/611 |
| 4,397,294 | A | 8/1983 | Mancebo | |
| 4,403,602 | A | 9/1983 | Warden | |
| 4,412,391 | A | 11/1983 | Bolognino | |
| 4,417,546 | A | 11/1983 | Hoskinson | |
| 4,429,661 | A | 2/1984 | McLure | |
| 4,473,063 | A * | 9/1984 | Mackensen | 126/591 |
| 4,479,487 | A | 10/1984 | Migdal | |
| 4,501,262 | A | 2/1985 | Lyon | |
| 4,512,288 | A | 4/1985 | Michaud | |
| 4,550,771 | A | 11/1985 | Arbabian | |
| 4,562,828 | A | 1/1986 | Koskela | |
| 4,644,934 | A | 2/1987 | Kaus | |
| 4,671,253 | A | 6/1987 | Blount, Sr. | |
| 4,718,403 | A | 1/1988 | McCall | |
| 4,898,152 | A | 2/1990 | Kahl | |
| 4,938,172 | A | 7/1990 | Belovarac | |
| 4,960,105 | A | 10/1990 | Gantz et al. | |
| 5,050,394 | A * | 9/1991 | Dudley et al. | 62/238.6 |
| 5,245,984 | A | 9/1993 | Longmore et al. | |
| 5,337,577 | A | 8/1994 | Eiermann | |
| 5,345,996 | A | 9/1994 | Druien | |
| 5,758,820 | A | 6/1998 | Celorier, Jr. et al. | |
| 6,253,564 | B1 * | 7/2001 | Yarbrough et al. | 62/238.7 |
| 6,263,964 | B1 * | 7/2001 | Yang | 165/300 |
| 7,287,394 | B2 | 10/2007 | Taras et al. | |
| 7,331,312 | B2 | 2/2008 | Choi | |
| 7,578,140 | B1 | 8/2009 | Wiggs | |
| 2005/0087186 | A1 | 4/2005 | Stahl | |
| 2007/0144574 | A1 | 6/2007 | Yada | |
| 2007/0227529 | A1 | 10/2007 | Rubio et al. | |
| 2007/0295826 | A1 | 12/2007 | Farrell | |
| 2008/0245087 | A1 * | 10/2008 | Orcutt | 62/238.7 |
| 2010/0031953 | A1 * | 2/2010 | Penev et al. | 126/615 |

FOREIGN PATENT DOCUMENTS

| | | | |
|---|---|---|---|
| CN | 101143616 | | 3/2008 |
| JP | 04015451 | | 1/1992 |
| JP | 11201559 A | * | 7/1999 |
| JP | 2002162109 | | 7/2002 |
| JP | 2002372302 A | * | 12/2002 |
| JP | 2004-012025 | | 1/2004 |
| JP | 2005-226924 | | 8/2005 |
| JP | 2006090689 A | * | 4/2006 |
| KR | 100619444 | | 8/2006 |

OTHER PUBLICATIONS

Hybrid Hot Water System, 2008, available at www.cheresources.com/hybridh2o.shtml.

ThePJKK HYbrid Hot Water System, Technical Assistance, Case Study, FEMP, Jan. 1977.

Solar and Hybrid Mechanical Systems, Eco-Home at Hawk Ridge, 2007, available at www.womenworkingorg/solarhouse/pdf_files/9-SolarHotWater-HybridHeating.pdf.

\* cited by examiner

| Condition | Action | Function |
|---|---|---|
| Measured refrigerant temperature or pressure greater than predetermined threshold Th1F11 in the first fluid loop between the heat exchanger and the fan. | Fan control means maintains fan activation | Fan is on when the refrigerant exiting the exchanger is too hot. |
| Measured refrigerant temperature or pressure less than predetermined threshold TH1F11 in the first fluid loop between the heat exchanger and the fan. | Fan control means maintains fan deactivation | Fan is off when the refrigerant exiting the heat exchanger is sufficiently cool and does not need to be further cooled by the fan prior to entering the expansion valve. |

Figure 2

| Condition | Action | Function |
|---|---|---|
| The difference between the measured temperature at the heat transferring medium in the fluid loop at the solar collector or HRU and the measured temperature of the potable water in the tank (112-1) is greater than a predetermined value. The measured temperature of heat transferring medium at the solar collector or HRU is less than a predetermined maximum temperature Tmax2. | Solar/HRU control means maintains circ pump & valves activation. | Circ pump & valves are on when the temperatures of the heat transferring medium at the solar collector or HRU is sufficiently greater than the temperature of the potable water in the tank to allow for efficient heat transfer. |
| Tank (112-1) is less than the predetermined value. | Solar/HRU control means maintains circ pump & valves deactivation. | Circ pump & valves are off when the temperature difference between the heat transferring medium at the solar collector or HRU and the water I the tank is insufficient to allow for efficient heat transfer. |
| Measured temperature of heat transferring medium at solar collector or HRU greater than predetermined maximum temperature Tmax2. | Solar/HRU control means maintains cir pump & valves deactivation. | Relief valve is configured to open position to allow for removal of some of the heat transferring medium from the fluid loop to reduce the presences and temperature therein. This prevents potential damage to one or more components in the Hybrid Water Heating Unit. |
| Measured water temperature in the tank exceeds the predetermined maxium temperature Tmax. | Solar/HRU control means maintains circ pump & valves deactivation. | Circ pump & valves are off when the water in the tank has reached the predetermined maximum temperature Tmax. |

Figure 3

HYBRID WATER HEATING SYSTEM

CROSS-REFERENCE TO RELATED APPLICATIONS

This application is a continuation-in-part of U.S. patent application Ser. No. 12/205,979 filed Sep. 8, 2008, whose contents are incorporated herein by reference and which in turn claims the benefit of priority from U.S. provisional patent application No. 61/086,819, filed on Aug. 7, 2008, the contents of which are hereby incorporated herein by reference, and a continuation-in-part of international patent application no. PCT/US2009/049741 filed Jul. 7, 2009, the contents of which are incorporated herein by referent and which in turn claims priority from U.S. patent application Ser. No. 12/205, 878 filed Sep. 8, 2008 and provisional patent application Ser. No. 61/086,819 filed Aug. 7, 2008.

BACKGROUND OF THE INVENTION

1. Field of the Invention

The present invention relates to a hybrid heating apparatus to heat potable water via "free heat", i.e., waste heat recovered by heat recovery units (such as refrigeration units) and heat from insolation units (such as by solar collection units). A single controller directs operation of a single pump to circulate fluid between at least one heat exchanger and each of the heat recovery units and insolation units and directs operation of valves to allow the fluid to be circulated to become heated before reaching the heat exchanger, which heat exchange with the potable water heats the same.

2. State of the Art

Commercial and residential facilities and dwellings include various systems for heating potable water. In generally, they primarily rely on a conventional water heater that includes either a fossil fuel (oil or natural gas) furnace or boiler or an electric water heater, although an increasing number of such facilities and dwellings have turned to a solar water heater to satisfy their demand for heating potable water to the extent feasible. If the solar water heater cannot meet the demand for potable water heating, then the conventional water heater is operated to satisfy the demand.

A solar water heater may be operated in either a closed loop system or an open loop system to heat potable water stored in a tank. In an open loop system, potable water to be heated is pumped from the tank directly to the solar water heater and back. In a closed loop system, glycol or other kind of fluid having a lower freeze temperature than that of water is pumped to the solar water heater for heating and pumped back to a heat exchanger for heating the potable water in the tank. In climates susceptible to freezing outdoor temperatures, the closed loop system for the solar water heater is used. In climates that are not susceptible to freezing outdoor temperatures, the open loop system may be used for the solar water heater.

In the case of a dedicated solar water heater, the piping may become cold when exposed to cold outdoor temperatures overnight when there is no insolation. At the time of sunrise (or later if they do not face the morning sun), the solar collectors can start again to heat fluid through insolation, but the solar water heater would be operating under a cold start and thus will need to heat the cold fluid circulating in the piping to a higher temperature before it can attempt to satisfy a demand for heating potable water.

Installation and operating costs affect the economic feasibility of incorporating a solar water heater into an existing commercial and residential facility and dwelling to satisfy needs to heat potable water. Thus, the need to heat circulating fluid in piping from a cold start adversely affects the economics of heating potable water by insolation since the conventional water heater will need to operate that much longer until the cold start condition is overcome. Further, the cost for installation and operation of a dedicated pump (and heat exchanger in the case of a closed loop) for the solar water heater adversely affect the economics of heating potable water by insolation.

JP2004012025 proposes an efficient hybrid system that improves the relationship between respective pieces of equipment in a solar system and a cogeneration system by reducing carrier power by inverter control. The hybrid system includes a solar heat collector, a heat storage tank, a heat exchanger to supply hot water, a hot water storage tank, an auxiliary boiler, a heat exchanger for collecting waste heat, a non-utility generator, an absorption type refrigerator, a refrigerating tower, a heater exchanger for heating, a system connection board for controlling the drive of each piece of equipment and a DC power supply board. The overall efficiency of operation is improved when both a solar heat collector and a refrigerant waste heat collector are used to heat water through respective heat exchangers as a supplement to a conventional boiler. However, the economics of such a system is adversely impacted by installing and running respective pumps and using respective heat exchangers for each water heating system, i.e., solar insolation, waste heat recovery, auxiliary boiler, etc.

It would be desirable to reduce the overall installation and operating costs to heat potable water that uses "free heat" from a solar water heater and refrigerant waste heat recovery units (HRU) by integrating them rather than keeping them as separate, stand-alone water heating systems.

SUMMARY OF THE INVENTION

A water heating apparatus is provided for controlling the heating of potable water in commercial or private dwellings with improved energy efficiency. The water heating system includes a tank that stores potable water in fluid communication with a potable water source, a refrigeration unit that circulates refrigerant for air conditioning or other refrigeration purposes, a heat recovery unit (HRU) that transfers heat from the circulating refrigerant of the refrigeration unit to the water stored in the tank via a heat exchanger, a solar water heater unit that extracts heat from insolation and transfers the extracted heat to the water stored in the tank preferably also via the same heat exchanger, and at most one circulating pump to circulate fluid between the heat exchanger and each of the HRU and preferably also the solar water heater (if in a closed loop system).

The refrigeration unit preferably includes circulating refrigerant, a compressor for compressing the refrigerant, a fan and an expansion valve for cooling the refrigerant, and an evaporator section that absorbs heat from a refrigeration area to cool the refrigeration area.

A single circulating pump is operated to circulate a heat transfer fluid between a heat exchanger and each of the heat recovery units. The heat exchanger exchanges heat with potable water stored in a tank.

The solar water heater unit includes a solar collector that extracts energy from insolation. If the solar water heater unit is in a closed loop, as are the heat recovery units, then the same circulating pump is operated to circulate the heat transfer fluid to the solar water heater to heat the heat transfer fluid as is used to circulate the heat transfer fluid between the heat exchanger and each of the heat recovery units. Otherwise, the solar water heater unit is in an open loop in the sense that potable water is circulated directly from the tank to the solar water heater to effect heating of the potable water directly.

The refrigeration unit, heat recovery unit, and solar water heater unit each include measuring means for measuring temperature, pressure, or other parameters at various locations in the system, and control means for controlling their operation based on the measured parameters to maximize the energy efficiency, hot water capacity, and longevity of the system while reducing the system's operational costs and fuel consumption.

The refrigeration unit preferably includes a fan control means which operates to deactivate (turn off) the cooling fan of the refrigeration unit when the refrigerant is sufficiently cooled on account of the operation of the heat exchanger in transferring heat away from the refrigerant to the water in the tank, and operates to activate (turn on) the cooling fan of the refrigeration unit when additional cooling is needed.

The heat recovery unit preferably includes HRU control means which operates to activate the heat recovery unit to circulate the first heat transfer medium in the second fluid loop when in an open loop situation (1) the temperature of the water in the second fluid loop becomes so low that it is in danger of freezing; and (2) when the difference between the temperature of the second heat transfer medium at the HRU exceeds the temperature of the potable water in the tank by a predetermined amount (e.g., 8-24.degrees. Fahrenheit). During normal operation, the temperature of the refrigerant between the HRU and the heat exchanger will generally be higher than the temperature of the water in the tank, and the water temperature in the tank will generally be below the maximum temperature desired. Thus, the heat exchanger operates to transfer energy from the refrigerant (which would otherwise need to be expelled to the atmosphere through the use of the fan) to the water in the tank, thereby reducing the fan's operation requirements.

The solar water heater unit preferably includes solar control means which operates to activate the solar water heater unit to circulate the second heat transfer medium in the third fluid loop when two conditions are met: (1) the difference between the temperature of the second heat transfer medium at the solar collector exceeds the temperature of the potable water in the tank by a predetermined amount (e.g., 8-24 degrees Fahrenheit); and (2) the temperature of the potable water in the tank is below the maximum tank temperature desired (e.g., below a maximum tank temperature that is less than 200 degrees Fahrenheit). The first condition allows for the activation of the solar water heater unit when efficient heat transfer can take place. The second condition is when tank temperature is above 185 degrees Fahrenheit controller 58 activates 3-way valve 72A to dissipate the heat to 71 (heat dump), until the tank temp is below 175 degrees Fahrenheit. The third condition prevents the water in the tank from exceeding a maximum temperature. A relief valve is provided to allow for the removal of a portion of the second heat transferring medium from the third fluid loop in the event that the second heat transferring medium gets too hot at the solar collector.

In other embodiments, an additional tank is utilized for storing the potable water. The additional tank is in fluid communication with both the tank (which operates as a preheater tank) and the potable water source, and bypass valves are provided which may be set to enable the potable water to bypass the tank and flow directly into the additional tank.

Additional objects, advantages, and embodiments of the invention will become apparent to those skilled in the art upon reference to the detailed description taken in conjunction with the provided figures.

BRIEF DESCRIPTION OF THE DRAWINGS

FIG. 2 is a table describing the function of the fan control means of the refrigeration unit of the invention.

FIG. 3 is a table describing the function of the water heating system control means of the solar water heater unit and HRU of the invention.

DETAILED DESCRIPTION OF THE PREFERRED EMBODIMENT

Figure 1:
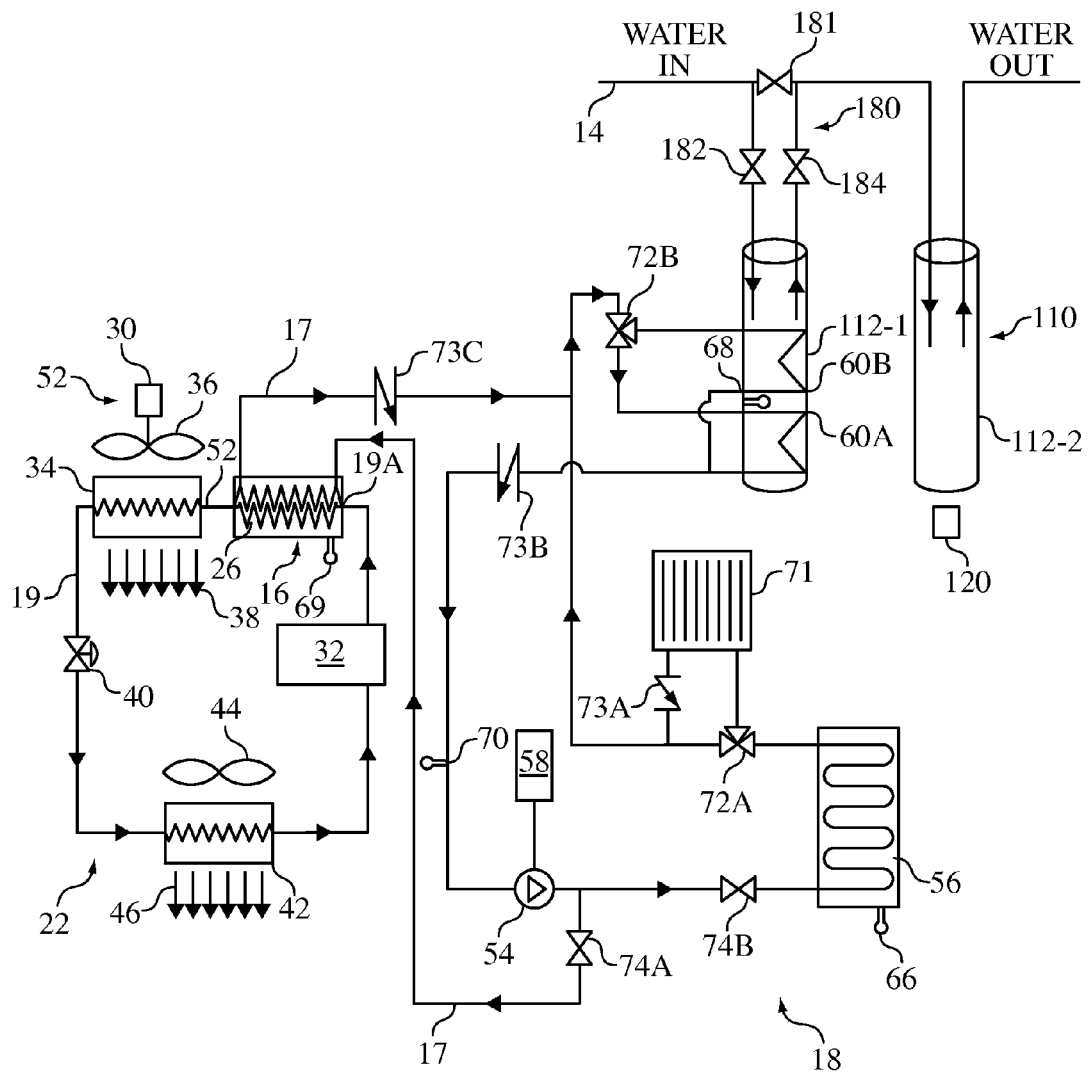
FIG. 1 is a schematic depiction of an exemplary embodiment of a water heating system according to the present invention.

Turning now to FIG. 1, a water heating apparatus or system 110 of the present invention is a two-tank system that includes a pre-heat tank 112-1, a conventional heating tank 112-2, and a bypass system 180. The conventional heating tank 112-2 in fluid communication with a source 14 of potable water such as, but not limited to, a well or a city water source. The tank 112-1 is configured to place water stored therein is fluid communication with a heat recovery unit 16, a solar water heater unit 18, and a heating element 120.

The system is configured to heat the potable water in the pre-heat tank 112-1 by using heat available from free sources (e.g., refrigeration and solar units) in conjunction with the conventional heating element 120 to provide an energy efficient hot water heating system 110, a conventional heating tank 112-2, and a bypass system 180. The conventional heating tank 112-2 includes a conventional heating element 120, which may be an electrically powered element, a gas-burning element, an oil-burning element, and combinations thereof. The combination of the pre-heat tank 112-1 with the heating tank 112-2 allows the system 110 to maximize the collection and storage of heat from the heat recovery unit 16 and the solar water heater or solar collection unit 18.

The heat recovery unit 16 of the system is in a heat exchange relationship with a conventional vapor compression refrigeration unit 22 such as, but not limited to, an air conditioner, a refrigerator, a freezer, a heat pump, or equivalent refrigeration units known in the art. The heat recovery unit 16 includes a circulating pump 54 and a valve 74A, which circulates fluid medium from the tank 112-1 through a flow loop 17, a heat exchanger 26, and a first controller 58. When heat is available from the vapor compression refrigeration unit 22, a controller 58 is configured to activate the pump 54 and a valve 74A, to pump the fluid medium from the tank 112-1 through the heat exchanger 26 and back into the tank 112-1.

The refrigeration unit 22 includes a flow loop 19 for circulating refrigerant. A compressor 32 operably coupled to the flow loop 19 compresses the refrigerant and passes the compressed refrigerant to a condenser 34. The condenser 34 is also operably coupled to the flow loop 19 and includes a cooling fan 36 to force outside air 38 across the condenser 34 to remove heat from the refrigerant within the flow loop 19. Thus, the refrigeration unit 22 typically consumes electrical energy to operate the cooling fan 36 to expel waste heat to the outside air 38. The compressed, condensed refrigerant is then expanded in an expansion valve 40 to a lower temperature, and then passed through an evaporator 42. The evaporator 42 includes a blower unit 44, which blows inside air 46 from a conditioned space across the evaporator 42. The refrigeration unit 22 thus provides conditioned air to a conditioned space.

The heat exchanger 26 of the heat recovery unit 16 is in heat exchange communication with the refrigerant in the flow loop 19 between the compressor 32 and the condenser 34, which is generally at a high temperature. The heat exchanger 26 operates to transfer waste heat (which is typically removed from the refrigerant by the fan 36 in the prior art) to the water in tank 112-1, which will generally be at a lower temperature than that of the refrigerant between the compressor 32 and the condenser 34. The heat exchanger 26 includes a first flow path 19a, which is part of the flow loop 19 of the refrigeration unit 16, and a second flow path 17a which is part of the flow loop 17 of the heat recovery unit 16 and in fluid communication with the first flow path 19a. The heat recovery unit 16 removes heat from the refrigerant in the flow loop 19 of the refrigeration unit 22 and in fluid communication with the potable water in the tank 12, which also reduces the typical cooling requirements of the fan 36.

The operation of the controller 58 of the heat recovery unit 16 of the system is best understood with reference to FIG. 1. The controller 58 activates the circulation pump 54 and a valve 74A, to circulate a fluid medium (heat transfer fluid) from the tank 112-1 through the heat exchanger 26 when heat is available from the refrigeration unit 22. For example, the controller 58 can receive a first sensor input 69 indicative of a condition of the refrigerant in the refrigeration unit 22 such as, but not limited to, a temperature signal, a pressure signal, or other signals conveying information related to the refrigerant's properties. When the first input 69 reaches a predetermined level indicating that heat is available from the refrigeration unit 22, the controller 58 may activate the circulation pump 54 and a valve 74A.

The controller 58 is also preferably configured to deactivate the circulating pump 54 and a valve 74A, to cease circulating fluid medium from the tank 112-1 through the heat exchanger 26 when the water within the tank 112-1 reaches a predetermined temperature. For example, the controller 58 may receive a second sensor input 68 indicative of the water temperature within the tank 112-1. When the second sensor input 68 reaches a predetermined level, the controller 58 deactivates the circulation pump 54 and a valve 74A. In one example, the second sensor input 68 may be a temperature signal and the predetermined level might be 155 degrees Fahrenheit (F).

The controller 58 may also be configured to activate the circulating pump 54 and a valve 74A, when the temperature of the fluid medium in the second fluid loop 17 becomes so low that it is in danger of freezing. For example, in an Open Loop configuration the controller 58 may receive a first sensor input 69 indicative of the fluid medium temperature within the second fluid loop 17. When the first sensor input 69 reaches a predetermined level, the controller 58 activates the circulation pump 54 and a valve 74A, to circulate water from the tank 112-1 through the second fluid loop 17 to prevent freezing therein. It is noted that if the refrigeration unit 22 is operational, then the circulating pump 54 will operate as discussed above to transfer heat from the refrigerant to the fluid medium at the heat exchanger 26.

In the event that the refrigeration unit 22 goes down during the winter months, the operation of the circulating pump 54 and a valve 74A, to circulate fluid medium from the tank 112-1 through the second fluid loop 17 will help to prevent the fluid medium from freezing in the second fluid loop 17. It is anticipated that other back-up sources of heat may be utilized with the system (such as gas or oil) to heat the tank 112-1 so that the tank 112-1 water will remain warm even during a long power outage. It is also anticipated that this anti-freezing operation of the controller 58 will be far less common, but will provide an important safety measure in the winter time to prevent the heat recovery unit 16 from freezing and increase its longevity.

The controller 58 can be embodied by a variety of control circuitry, such as a programmed controller or dedicated hardware logic (PLD, FPGA, ASIC) and supporting circuitry (e.g., thermistors for temperature sensing or pressure transducers for pressure sensing), one or more relays and supporting circuitry (e.g., thermostats for temperature sensing or pressure controllers for pressure sensing) or other suitable circuitry.

Figure 4:
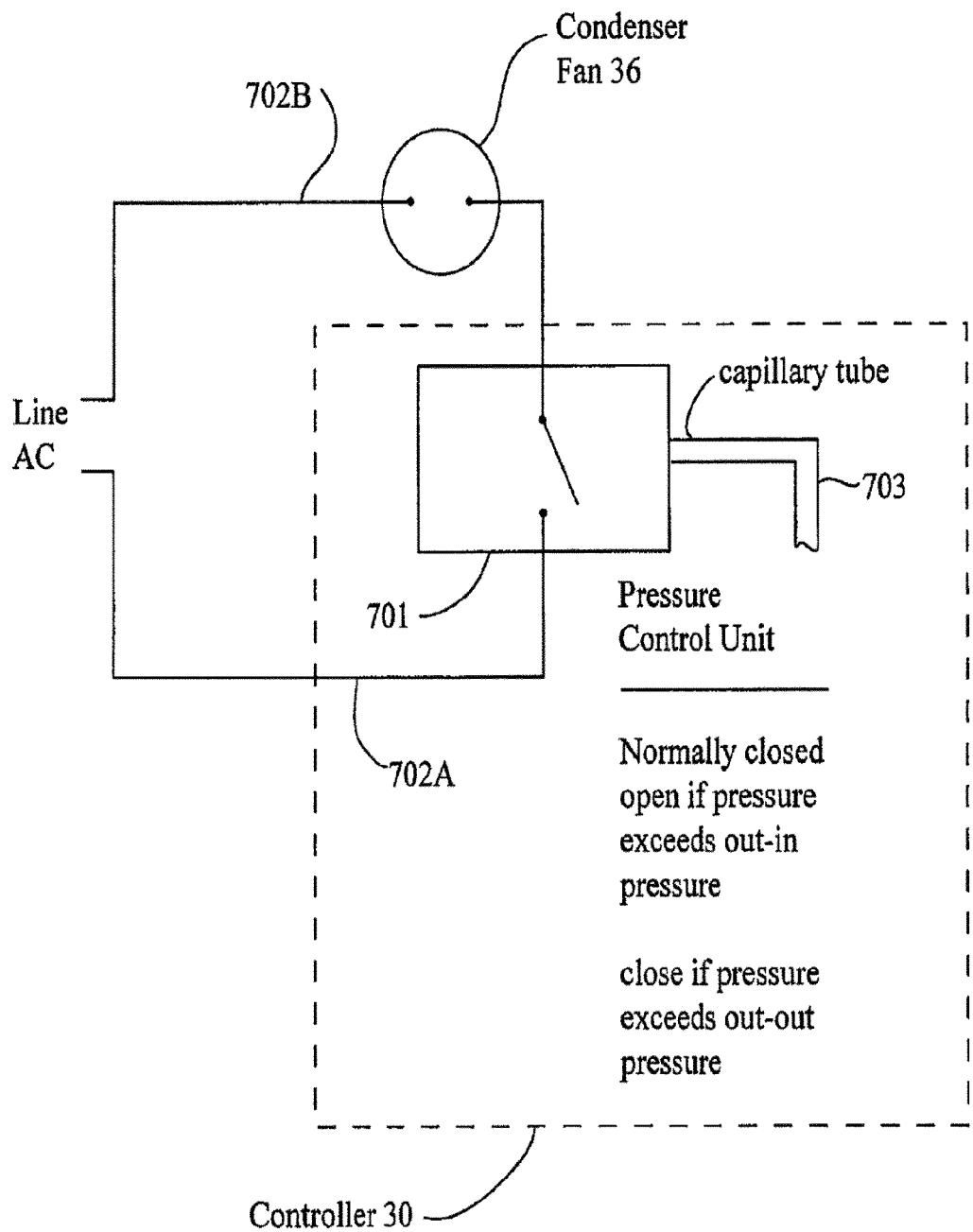
FIG. 4 is a schematic of the circuitry of an embodiment of the operational control of the fan of the invention.

The operational control of the fan 36 of the refrigeration unit 16 is best understood with reference to FIGS. 1, 2 and 4. A fan control 30 is provided in the form of a delay relay or controller in electrical communication with the fan 36. During normal operation of the refrigeration unit 16, the fan control 30 delays the operation of the fan 36 until a condition within the refrigeration unit 16 reaches a predetermined level. As discussed above, the heat recovery unit 16 removes heat from the refrigerant in the flow path 19a of the flow loop 19 of the refrigeration unit 22 that would otherwise need to be removed by the fan 36. Thus, the fan 36 need not be operated until the heat recovery unit 16 can no longer remove enough heat from the refrigeration unit 22 to keep the refrigeration unit 16 operating in a desired manner.

For example, in medium temperature refrigeration units such as those present in a restaurant, bar, or other commercial establishment, it is typically desired that the refrigerant exiting the condenser 34 be in a vapor condition with a desired temperature and/or pressure. The fan control 30 receives a fourth input 52 from the refrigeration unit 22 which is indicative of the temperature of refrigerant within the flow loop 19 of the refrigeration unit 16. The fan control 30 maintains the fan 36 in an off condition until the fourth input 52 reaches a predetermined level, at which time, the fan control 30 activates the fan 36 to expel heat from the refrigerant to the ambient air 38 at the condenser 34.

In one preferred embodiment, the fourth input 52 is a pressure input from a pressure transducer 52-1 positioned in the flow loop 19 of the refrigeration unit 22 between the heat exchanger 26 and the condenser 34. If the pressure of the refrigerant in the flow loop 19 exceeds a predetermined limit after passing through the heat exchanger 26, then insufficient heat has been removed from the refrigerant by the heat exchanger 26. Typically, this results from the water in the tank 112-1 being of a sufficiently high temperature from the heat already collected by the heat recovery unit 16 and/or the solar collection unit 18 (further discussed below).

When the pressure of the refrigerant in the flow loop 19 exceeds a predetermined limit after passing through heat exchanger 26, the fan control 30 activates the cooling fan 36 to expel waste heat from the refrigerant to the outside air 38. Conversely, when the pressure of the refrigerant in the flow loop 19 is below the predetermined limit after passing through heat exchanger 26, the fan control 30 maintains the cooling fan 36 in a normally deactivated state. In embodiments of the invention in which the refrigeration unit 22 is a medium temperature refrigeration unit, the predetermined pressure limit at transducer 52-1 could be approximately 200 pounds per square inch (PSI).

The controller 30 can be embodied by a variety of control circuitry, such as a programmed controller or dedicated hardware logic (PLD, FPGA, ASIC) and supporting circuitry (e.g., thermistors for temperature sensing or pressure transducers for pressure sensing), one or more relays and supporting circuitry (e.g., thermostats for temperature sensing or pressure controllers for pressure sensing) or other suitable circuitry. An exemplary embodiment of controller 30 is shown in FIG. 4, which includes a pressure control unit 701 in electrical connection between one leg 702A of line AC and one of the terminals of the condenser fan 36 as shown. The other terminal of the condenser fan is connected to the other leg 702B of line AC. A capillary tube 703 is in fluid communication with the fluid loop 19, preferably at a point downstream of the heat recovery unit 26 and upstream of the condenser 34 (e.g., preferably at 52-1 as shown, but may optionally be placed anywhere along the length of the condenser) in order to sample the pressure of the refrigerant in the fluid loop 19. The pressure control unit 701 measures the sampled pressure of the refrigerant of the fluid loop 19 and provides a normally-off current path between leg 702A and the terminal of the condenser fan 36 that is turned on when the sampled pressure reaches a predetermined cut-in pressure. This current path is then returned to the normally-off state when the pressure falls below a predetermined cut-off pressure. In the preferred embodiment, the cut-in and cut-out pressures are set by user input (for example, by user adjustment of dials for setting such cut-in and cut-out pressures). In the preferred embodiment, the pressure control unit 701 is realized by a unit (e.g., the 016 Single Pressure Control unit) sold commercially by Ranco Controls of Delaware, Ohio.

Thus, system 110, through the operation of the fan control 30 of the refrigeration unit 22, maximizes the amount of heat recovered by the heat recovery unit 16 by eliminating the expulsion of heat from the refrigerant to the ambient air when such expulsion not needed. Further, system 110 minimizes energy usage by leaving fan 36 in a normally "off" state until such time as the heat recovery unit 16 no longer has sufficient capacity to remove enough heat from the refrigerant in the flow loop 19 to keep the refrigeration unit 22 operating as desired.

The system 110 of the present invention also preferably incorporates in one fluid medium loop of a hybrid water heating system, the solar water heater unit 18, and uses it in conjunction with the heat recovery unit 16. The solar water heater unit 18 and HRU 16 and its operational control is best understood with reference to FIG. 1.

The solar collection unit 18 provides heat captured from solar energy to the water in the tank 112-1. Thus, the water in tank 112-1 is heated not only by the heat recovery unit 16, but also by the solar collection unit 18. The fan control 30 protects the refrigeration unit 22 from damage due to overheating and maintains the refrigeration unit 22 in a desired operating condition when a large amount of heat is added to the water in the tank 112-1 by both the heat recovery unit 16 and solar collection unit 18 thru one Solar and HRU fluid medium Loop.

The solar collection unit 18 includes a circulating pump 54, which circulates a heat transfer medium through a flow loop 17. A solar collector 56 and a heat exchanger 60A or B are operably coupled via three-way valve 72B to the flow loop 17 as shown in FIG. 1. A controller 58 is provided for selectively activating and deactivating the circulating pump 54 of the solar collection unit 18. When heat is available from solar energy the controller 58 is configured to activate the circulating pump 54 to pump a heat-transfer fluid such as, but not limited to, propylene glycol through the solar collector 56 and the heat exchanger 60A or B via the fluid loop 17. The solar collector 56 thus heats the heat-transfer fluid, and the heat from the heat-transfer fluid is used to indirectly heat the water in the tank 12 via the heat exchanger 60A or B.

The fluid loop 17 of the solar collection unit 18 and HRU 16 is shown (FIG. 1) by way of example as an indirect or closed-loop circulation system where the circulating pump 54 circulates the heat-transfer fluid through the solar collector 56 and HRU 16 in fluid communication with the heat exchanger 60A or B to indirectly heat the water in the tank 112-1. However, the solar collection unit 18 may also be a direct or open-loop circulation system in which the pump 54 circulates the potable water from the tank 112-1 directly through the solar collector 56 and HRU 16 back into the tank 112-1.

Conversely, while the fluid loop 17 of the heat recovery unit 16 is shown (FIG. 1) by way of example as a indirect or closed-loop circulation system where the pump 54 circulates the fluid medium from the tank 112-1 through the heat exchanger 26 and back into the tank 112-1, the fluid loop 17 may instead be an indirect or closed-loop circulation system isolated from the water in the tank 112-1 in which the pump 54 circulates a heat-transfer fluid through the heat exchanger 26 and through an additional heat exchanger 60 A or B in a heat exchange relationship with the water in tank 112-1 to indirectly heat the water in the tank.

In addition, the heat exchanger 60A or B disposed at the tank 112-1 is shown by way of example only as a flat heat exchanger in tank 112-1. However, it is contemplated that the heat exchanger 60 may be any device sufficient to place the heat-transfer fluid of the solar collection unit 18 in a heat exchange relationship with the water in the tank 112-1. The tank 112-1 may also be a jacketed tank in which the heat exchanger 60 forms a heat exchange jacket around the outer surface of the tank 112-1.

The solar collector 56 can be any device sufficient to collect heat from solar energy. For example, the solar collector 56 can be a glazed flat-plate collector, an un-glazed flat-plate collector, an evacuated-tube solar collector, a photo-voltaic module, a drain-back system, and any combinations thereof.

The term "glazed flat-plate collectors" used herein refers to collectors having an insulated, weatherproofed box that contains a dark absorber plate under one or more glass or plastic covers. The term "unglazed flat-plate collectors" used herein refers to collectors having a dark absorber plate, made of metal or polymer, without a cover or enclosure. The term "evacuated-tube solar collectors" used herein refers to collectors having parallel rows of transparent glass tubes where each tube contains a glass outer tube and a metal absorber tube attached to a fin. The fin's coating absorbs solar energy but inhibits radiative heat loss. The term "photo-voltaic module" used herein refers to collectors having an array of photo-voltaic cells that convert solar energy into electrical potential. The electrical potential can be used to provide current to an electrical heating element, which heats the water in the tank 12.

The controller 58 of the solar water heater unit 18 controls the circulating pump 54 and a valve 74B, to circulate the heat-transfer fluid from the heat exchanger 60 in the tank 112-1 through the solar collector 56 only when heat is available at the solar collector 56. For example, the controller 58 may receive an input 66 indicative of a condition of the solar collector 56. The input 66 may include, but is not limited to, a temperature signal indicative of the temperature of the heat-transfer fluid at the solar collector 56. When the input 66 reaches a predetermined limit indicating that sufficient heat is available from the solar collector 56, the controller 58 activates the circulation pump 54 and a valve 74B.

The controller 58 is preferably configured to activate the circulating pump 54 and a valve 74B, to cease circulating the heat-transfer fluid through the solar collector 56 and the heat exchanger 60 when the water within the tank 112-1 reaches a predetermined temperature. For example, the controller 58 can receive an input 68 indicative of a temperature of the water within the tank 112-1. When the input 68 reaches a predetermined limit, the controller 58 deactivates the circulating pump 54 and a valve 74B. The circulating pump 54 can be an electrically powered pump, powered by a standard 115-volt power source. The pump 54 may also be powered by electricity collected by a photo-voltaic solar collector (not shown).

The controller 58 is described by way of example as operating based on a temperature limit (e.g., sensed from an input 66) and a temperature limit (e.g., sensed from an input 68). However, as discussed in FIG. 3, the controller 58 may also operate as a differential controller in which the controller 58 activates the circulating pump 54 and a valve 74B, when the inputs 66, 68 are indicative of a temperature differential of at least a predetermined value. For example, the controller 58 can be configured to activate the circulating pump 54 and a valve 74B, when the 66, 68 are indicative of at least approximately 8 degrees Fahrenheit (F) and can deactivate the pump 54 and a valve 74B, when the temperature differential is less than approximately 8 degrees Fahrenheit (F). Similarly, the controller 58 of the heat recovery unit 16 (FIG. 1) may be configured to operate as a differential controller in which the controller 58 only activates the circulating pump 54 and a valve 74A, when the inputs 69/68 are indicative of at least a predetermined value. The controller 58 can also operate to deactivate the circulating pump 54 and a valve 74B, upon the input 66 exceeding a temperature limit indicative that the solar collector is at a maximum temperature for preventing damage to system components. A relief valve (not shown) is operably coupled to the flow loop 17 for lowering the pressure within the flow loop 17 in the event that the input 66 exceeds the temperature limit. In an open configuration of the relief valve, the second heat transferring medium is drained from the flow loop 17 in gas or liquid form to lower the pressure therein.

The controller 58 can be embodied by a variety of control circuitry, such as a programmed controller or dedicated hardware logic (PLD, FPGA, ASIC) and supporting circuitry (e.g., thermistors for temperature sensing or pressure transducers for pressure sensing), one or more relays and supporting circuitry (e.g., thermostats for temperature sensing or pressure controllers for pressure sensing) or other suitable circuitry. In an exemplary embodiment, the controller 58 is realized by a programmed controller adapted for differential temperature control of solar energy systems, such as the Resol module.

Preferably, only one common pump is needed to circulate the fluid through all of the heat recovery units and, preferably, the solar collector. The controller 58 is configured to send signals to direct the only one common pump to circulate the fluid, which becomes heated with, in effect, free heat available from the solar collection unit during daylight hours and from the at least one refrigeration unit during hours of operation of the at least one refrigeration unit so as to maintain a temperature in the common piping higher that would otherwise arise if there was just one of the solar collection unit and the refrigeration unit but not both. The higher temperature of the fluid allows the free heat to heat the fluid to a desired temperature quicker to meet demand than would otherwise be the case if the fluid temperature were at a lower temperature.

The controller 58 may be configured to receive a heat demand signal indicative of a demand for heating the potable water and a heat demand satisfaction signal indicative of satisfying the demand. The controller is configured to send a command signal to the only one pump to circulate the fluid to satisfy the demand if the demand is not yet met based on receipt of the heat demand signal. The controller 58 is configured to send a command signal to the only one pump to cease the fluid circulation once the demand for heating the potable water has been met based on receipt of the heat demand satisfaction signal.

Further piping may be provided between the tank and the solar collector unit to bypass the at least one heat exchanger to establish fluid communication directly between the tank and the solar collector unit via the further piping.

When heat is unavailable from either the heat recovery unit 16 or the solar collection unit 18, the system 110 utilizes a conventional heating element 120 to heat the water in the tank 112-2. Heating element 120 may be an electrically powered element, a gas-burning element, an oil-burning element, and combinations thereof.

The hybrid hot water heat system 110 of the present invention thus combines three heating sources, two of which are available without consuming additional energy. Additionally, the fan control 30 of the hybrid hot water heat system 110 of the present invention selectively activates and deactivates the fan 36 of the vapor compression refrigeration unit 22 to minimize the available heat expelled to the ambient air 38. The fan control 30 also maximizes the amount of heat recovered by the heat recovery unit 16 and minimizes the amount of energy used while protecting the vapor compression refrigeration unit 22 from being damaged.

The bypass system 180 allows a user to divert incoming water from the water source 14 to bypass the pre-heating tank 112-1 to flow directly into the heating tank 112-2. In the illustrated embodiment of FIG. 1, the bypass system 180 includes a first valve 182, a second valve 184, and a third valve 186, each being a two-way valve having an open state and a closed state. When an operator desires the use of the pre-heating tank 112-1, the first and second valves 182, 184 can be moved to the open state while the third valve 186 is moved to the closed state. In this configuration, water from the water source 14 flows through the first valve 182 into the pre-heat tank 112-1 and from the pre-heat tank 112-1 to the heating tank 112-2 through the second valve 184.

Conversely, when an operator desires to bypass pre-heating tank 112-1, the first and second valves 182, 184 can be moved to the closed state while the third valve 186 is moved to the open state. In this configuration, water from the water source 14 flows through the third valve 186 directly into the heating tank 112-2 without passing through pre-heating tank 112-1.

The bypass system 180 is described above by way of example as a manually activated system in which the operator moves the valves 182, 184, 186 between the open and closed states. However, it is contemplated that the valves of bypass system 180 may be automatically controlled between the open and closed states based on the availability of heat from either the heat recovery unit 16 or the solar collection unit 18.

Additionally, the bypass system 180 is described above by way of example with respect to the three separate two-way valves 182, 184, and 186. However, it is contemplated that the bypass system 180 may include any combination of valves sufficient to selectively place the pre-heating tank 112-1 in fluid communication with the water source 14 and the heating tank 112-2. For example, it is contemplated that the bypass system 180 may include one three-way valve that replaces the first and third valves 182, 186.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it is not intended that the invention be limited thereto, and it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments.

What is claimed is:

1. A hybrid fluid heating apparatus, comprising a controller that:
   (a) in response to both sensing of a demand for more heat at a tank containing potable water and sensing of an availability of heat from a refrigerant within at least one vapor compression refrigeration unit, maintains a cooling fan in a deactivated state and commands that circulation of fluid occur between the tank and at least one heat exchanger that extracts heat from the refrigerant to heat the fluid,
   (b) in response to sensing that the demand for more heat at the tank is satisfied, ceases the circulation of the fluid between the tank and the heat exchanger and activates the cooling fan to blow across a condenser of the at least one vapor compression refrigeration unit to expel waste heat from the refrigerant to ambient air,
   (c) in response to both sensing of the demand for more heat at the tank and sensing an availability of heat by insolation from at least one solar collector unit, commands that circulation of the fluid occur between the tank and the at least one solar collection unit to heat the fluid by the at least one solar collection unit;
   (d) in response to both sensing that the demand for more heat at the tank is satisfied and sensing of an availability of heat from the at least one solar collection unit, commands that the circulation of the fluid from the at least one solar collection unit divert to a heat dump before flowing to the tank; and
   (e) implements the circulation of the fluid in each of (a) and (c) and directs activation of at most a single circulation pump to enable the circulation of the fluid via associated in-line valves and common piping.

2. The apparatus of claim 1, comprising:
   the tank storing potable water and in fluid communication with a source of potable water;
   demand means for issuing a heat demand signal indicative of a demand to heat the potable water stored in the tank when demand arises and for issuing a satisfied heat demand signal indicative of satisfying the demand for heating the potable water stored in the tank when the demand is satisfied, the controller being responsive to receipt of the heat demand signal to fulfill (a) and (d) and to receipt of the satisfied heat demand signal to fulfill (b) and (c);
   refrigeration means for effecting refrigeration, the refrigeration means including the at least one vapor compression refrigeration unit, the refrigeration means also including a flow loop for circulating refrigerant, a compressor operably coupled to the flow loop to compress the refrigerant and pass the compressed refrigerant to a condenser, the condenser being operably coupled to the flow loop and including the cooling fan to force outside air across the condenser to remove heat from the refrigerant within the flow loop, the refrigerating means further including an expansion valve arranged and configured to expand the compressed, condensed refrigerant to a lower temperature than before expansion and to then pass the lower temperature refrigerant through an evaporator that includes a blower unit that blows air across the evaporator;
   heat exchange means for effecting heat exchange within the tank, the heat exchange means including the at least one heat exchanger;
   the common piping being in fluid communication with the at least one heat exchanger;
   heat recovery means for heating the fluid with recovered heat from the at least one vapor compression refrigeration unit, the heat recovery means including at least one heat recovery unit in fluid communication with the common piping and in heat exchange relationship with the at least one vapor compression refrigeration unit;
   solar collector means for heating the fluid with collected solar heat, the solar collector means including the at least one solar collector unit in fluid communication with the common piping;
   fluid circulation means for circulating the fluid through each of the common piping, the at least one heat exchanger, the at least one heat recovery unit and the at least one solar collector, the fluid circulation means circulating the fluid by pumping with the single circulating pump only;
   a plurality of in-line valves located between the common piping and each of the at least one heat recovery unit and the at least one solar collector unit, the plurality of in-line valves including the associated in-line valves;
   sensor means for generating sensor readings, the sensor means including a plurality of sensors arranged in a vicinity of the at least one heat recovery unit and at least one the solar collector unit, the plurality of sensors generating sensor readings necessary for determining whether conditions are suitable to heat the circulating fluid to fulfill the sensing in (a), (b), (c), (d) and (e); and
   controller means including the controller for evaluating the demand signal and the sensor readings to make a determination as to whether the conditions are suitable to heat the circulating fluid by each of the at least one solar collector and the at least one heat recovery unit and for sending command signals to selectively open and close individual ones of the plurality of in-line valves based on results of the determination to satisfy the demand for heating the stored potable water in the tank via the at least one heat exchanger, the at least one vapor compression refrigeration unit being selected from a group consisting of a refrigerator, a freezer, an air conditioner and a heat pump that includes the cooling fan.

3. The apparatus of claim 2, wherein the controller means is also for sending signals to direct the single circulating pump to circulate the fluid, which becomes heated with in effect free heat available from the at least one solar collection unit during daylight hours and from the at least one refrigeration unit during hours of operation of the at least one refrigeration unit so as to maintain a temperature in the common piping higher that would otherwise arise if there was just one of the at least one solar collection unit and the at least one refrigeration unit but not both, the higher temperature of the fluid allowing the free heat to heat the fluid to a desired temperature quicker to meet demand than would otherwise be the case if the fluid temperature were at a lower temperature.

4. The apparatus of claim 2, wherein the controller means is also for issuing a command signal to the single circulating pump to circulate the fluid to satisfy the demand if the demand is not yet met based on receipt of the heat demand signal, the controller being configured to send a command signal to the single circulating pump to cease the fluid circulation once the demand for heating the potable water has been met based on receipt of the heat demand satisfaction signal.

5. The apparatus of claim 2, further comprising further piping between the tank and the solar collector unit that bypasses the at least one heat exchanger to establish fluid communication directly between the tank and the solar collector unit via the further piping.

6. The apparatus of claim 2, wherein the heat recovery means being configured for removing heat from the refrigerant, said controller including measuring means for measuring a property of the refrigerant, said controller being adapted for selectively activating and deactivating said cooling fan based upon the property of the refrigerant measured by the measuring means, said controller being configured for activating said cooling fan when the property of the refrigerant measured by the measuring means is higher than a threshold and for deactivating said cooling fan when the property of the refrigerant measured by the measuring means is lower than the threshold.

7. The system of claim 6, wherein the measured property of the refrigerant is one of temperature and pressure.

8. The system of claim 2, further comprising the heat dump in fluid communication with the common piping, the controller being responsive to the satisfied heat demand signal from the heat demand means for sending signals to appropriate ones of the in-line valves to cause the circulating fluid to enter the heat dump to effect the dissipation of the heat of the circulating fluid emerging from the solar collector.

9. The system of claim 2, wherein the at least one vapor compression refrigeration unit is a freezer.

10. The system of claim 2, wherein the at least one vapor compression refrigeration unit is a refrigerator.

11. The system of claim 2, wherein the at least one vapor compression refrigeration unit is a part of an air conditioner.

12. The system of claim 2, wherein the at least one vapor compression refrigeration unit is part of a heat pump.

13. The system of claim 2, wherein the common piping includes a Tee junction downstream of the single circulating pump with one leg of the Tee junction being upstream of an inlet of the at least one solar collector and another leg of the Tee junction being upstream of an inlet of the at least one heat recovery unit, the common piping including a further Tee junction upstream of the at least one heat exchanger with one leg of the further Tee junction being downstream of an outlet of the at least one solar collector and another leg of the further Tee junction downstream of an outlet of the at least one heat recovery unit.

14. The apparatus of claim 1, wherein the controller is responsive to sensing of temperature of the fluid becoming so low that the fluid is in danger of freezing for activating the single circulating pump and the associated in-line valves to effect circulation of the fluid from the tank to prevent freezing.

15. The apparatus of claim 1, wherein the tank contains potable water, further comprising sensors that generate sensor readings from heat recovery units and the at least one solar collection unit and the tank by carrying out the sensing of (a)-(d), the controller being configured and arranged to receive the sensor readings and the demand for more heat, to determine an extent to which the demand may be satisfied from heat available from the heat recovery units and the at least one solar collection unit, and to send command signals to both the single circulation pump and to appropriate ones of the associated in-line valves to fulfill (e) and thereby allow the fluid to circulate to the at least one heat exchanger for effecting heat exchange to heat the potable water within the tank, the at least one heat exchanger being part of the heat recovery units.

16. The apparatus of claim 15, further comprising the controller directs the at least one circulation pump and the associated in-line valves to circulate the fluid through common piping to heat the potable water in the tank by the heat recovery units during hours of operation of the at least one vapor compression refrigeration unit and by the at least one solar collection unit during daylight hours.

* * * * *